Patented Mar. 6, 1934

1,950,214

UNITED STATES PATENT OFFICE 1,950,214

METHOD OF SOLDERING METAL OBJECTS

Kurt Bassler, Westend, Berlin, Germany, assignor to General Electric Company, a corporation of New York No Drawing. Application December 2, 1929, Serial No. 411,205. In Germany April 6, 1929

3 Claims. (Cl. 113—112)

It is well known that metal objects may be connected or joined together by introducing an alloying metal between the contacting surfaces while heating them in a reducing atmosphere. The crevices between the two metal objects which are to be connected are kept very small so that the solder introduced between the metal objects may combine as thoroughly as possible with them thereby increasing the strength of the soldered joint. If the connection of iron and steel pieces is concerned, copper is especially suitable as an alloying metal. Copper, however, is readily fusible and consequently it is necessary to decrease the distance between the metal objects to be joined by means of compression or shrinking to such an extent that capillary crevices are created into which the copper solder may be drawn.

In those cases where the formation of capillary crevices is not possible because the metals which are to be soldered together cannot be brought under compression or because capillary crevices are formed only partly during the compression, pure copper solder cannot be used as it would run through the wide crevices and alloyage of the copper solder and metal objects to be connected would not take place.

The present invention covers a method of soldering which gives a dependable connection between objects which are to be connected even where wide crevices (about 1/20 mm.) occur, the solder employed forming an alloy with the objects which are to be connected under circumstances where copper or a brass solder could not be employed successfully owing to the absence of capillary action.

According to my invention a welding metal of a copper nickel alloy is employed in a reducing atmosphere for this purpose, the content of nickel in the alloy being increased as the width of the crevice between the parts to be joined is increased.

Copper-nickel-zinc alloys have heretofore been employed as a solder in connection with a known flux medium such for example as borax. In order to obtain a uniform distribution of this flux medium on the surfaces to be joined by means of such solder, the touching or adjacent surfaces must be kept at a certain distance from each other. After melting the solder remains between the two metal parts to be connected in a non-alloyed condition. The connection therefore only has the same tearing strength as the soldering medium.

To alloy the soldering medium with metal parts which are to be connected and to increase in that way the strength of the soldered joint, it has been suggested to press the metal parts together under high pressure and to melt the soldering metal in a reducing atmosphere without soldering salt, employing copper or brass as the soldering medium. However, under such conditions, it has been demonstrated that the soldering metal will run through the separating crevice when the width of the joint is more than 1/50 of a mm. and it is impossible therefore to solder joints in the well known manner when crevices of this width occur between the parts to be joined.

To make possible an alloyage of the soldering metal with the metal parts which are to be connected in the case of wide crevices, the present invention contemplates the use, in a reducing atmosphere such as hydrogen, of a solder consisting of a copper-nickel alloy. The property of a copper-nickel alloy which consists of a mixture of crystals in the liquid as well as in the solid state, which crystals easily combine with the objects which are to be connected, is of especial advantage in this case. The addition of nickel to the copper further makes the alloy more viscous in direct proportion to the nickel content. The solder therefore flows only slowly into the joints and remains there, simultaneously forming an alloy with the adjacent walls, It has already been determined that copper solder becomes thicker as nickel is dissolved from Monel metal when the latter is soldered with copper. This phenomenon is disadvantageous since the walls to be soldered are weakened on account of the removal of the nickel and the viscous copper solder penetrates only slightly into the capillary crevices which are provided for the soldering. The present invention consists in the fact that these properties of the copper nickel solder which have so far been considered detrimental are purposely employed in cases where these properties can be used to advantage.

The increase of the nicked content in the solder raises its melting temperature. This is not always desirable as it is sometimes inadvisable to subject the metal objects which are to be connected to such a high temperature because the furnace which is to be used for the soldering may be injured by the use of such a temperature. Under such conditions, it is advantageous to add to the copper-nickel alloy in a known manner a more readily fusible metal, for example zinc, tin, lead, aluminum, cadmium, etc., or several such metals which will not decrease the ability of the solder to combine with the parts to be connected. The melting temperature of the solder is thus decreased while the desired viscosity is not decreased to the same extent because the decrease of the melting temperature of the solder on account of the added metal takes place more rapidly than the decrease in viscosity. Even in cases where the decrease of the melting temperature is not of prime importance and where only a slight viscosity is desired, it is under certain circumstances advantageous to add the easily fusible metal instead of decreasing the nickel content of the copper nickel solder. Such cases, for instance, occur where a copper nickel alloy with a small nickel content is difficult to manufacture or where a copper nickel alloy of larger nickel content which is easily obtainable must be used for economic reasons. By adding one or more easily fusible metals the pronounced viscosity of the copper nickel alloy which is more easily manufactured or obtainable can be decreased to the desired extent.

If, notwithstanding the compression of the metal parts which are to be soldered together, no capillary crevices occur at some points, the solder used must be in the first place sufficiently readily fusible in order to be able to penetrate in the capillary joints and in the second place must be sufficiently viscous so that it will stick in the wider joints and soldering will occur at all points. An example of a solder which is suitable in such a case is an alloy of approximately 64% copper, 25% nickel and 11% zinc, the melting temperature of which is approximately 1160° and which permits the use of electrically heated soldering furnaces without overloading the heating strips of the furnace. The present method is especially suitable for soldering cylinder covers consisting of several parts, pistons and other parts of internal combustion engines, i. e. all such parts which are not made of one casting but which are assembled of several easily made pieces of rolled or mild steel possibly using some case parts. It is frequently difficult in the case of such covers to obtain at the connections capillary crevices which enable copper solder to penetrate as there is no opportunity to apply the necessary pressure. In such cases the present method provides perfectly soldered seams even in the case of crevices which do not act as capillary crevices.

What I claim as new and desire to secure by Letters Patent of the United States, is:

1. The method of joining two juxtaposed metal structures separated by a crevice which is narrow but wider than one into which molten copper or brass solder could be drawn by capillary action, which comprises heating said structures in a reducing atmosphere and flowing into said crevice and alloying with each of said structures a bonding medium consisting substantially of copper, nickel and a readily fusible metal, the copper being in excess of the nickel and the nickel in excess of said readily fusible metal.

2. The method of joining two juxtaposed metal structures separated by a crevice which is narrow but wider than one into which molten copper or brass solder could be drawn by capillary action, which comprises heating said structures in a reducing atmosphere and flowing into said crevice and alloying with each of said structures, a bonding medium consisting substantially of copper and nickel, the percentage of nickel in said bonding medium being sufficiently high to render the bonding medium substantially more viscous when melted than copper.

3. The method of joining two juxtaposed metal structures separated by a crevice which is narrow but wider than one into which molten copper or brass solder could be drawn by capillary action, which comprises heating said structures in a reducing atmosphere and flowing into said crevice and alloying with each of said structures, a bonding medium consisting substantially of copper and nickel, the copper content of said medium being in excess of the nickel and increasing or decreasing the nickel content of said bonding medium as said crevice increases or decreases respectively in width.

KURT BASSLER.